United States Patent [19]
Yang et al.

[11] Patent Number: 5,699,760
[45] Date of Patent: Dec. 23, 1997

[54] COOLING SYSTEM FOR INTERNAL COMBUSTION ENGINE

[75] Inventors: Jialin Yang, Canton; George Fredric Leydorf, Jr., Birmingham; Richard Walter Anderson, Ann Arbor, all of Mich.

[73] Assignee: Ford Global Technologies, Inc., Dearborn, Mich.

[21] Appl. No.: 829,031

[22] Filed: Mar. 21, 1997

[51] Int. Cl.$^6$ ............................................. F02B 75/18
[52] U.S. Cl. ........................... 123/41.74; 123/41.32; 123/41.79
[58] Field of Search ................... 123/41.72, 41.74, 123/41.32, 41.79

[56] References Cited

U.S. PATENT DOCUMENTS

| | | | |
|---|---|---|---|
| 4,319,547 | 3/1982 | Bierling | 123/41.29 |
| 4,494,491 | 1/1985 | Takada et al. | 123/41.72 |
| 4,834,030 | 5/1989 | Bauer et al. | 123/41.72 |
| 5,115,771 | 5/1992 | Ozawa et al. | 123/41.72 |
| 5,337,704 | 8/1994 | Roth | 123/41.29 |
| 5,357,910 | 10/1994 | Wenger et al. | 123/41.74 |

FOREIGN PATENT DOCUMENTS 531216  7/1955  Italy ..................... 123/41.74

OTHER PUBLICATIONS

SAE Technical Paper 912469, "Development of High Performance Engine for Passenger Cars", Suematsu et al, Toyota, pp. 145–157.
SAE Technical Paper 912467, "Improvement of Toyota 4-valve Standard Engines", Matsuda et al, Toyota.
SAE Technical Paper 970624, "Analysis of a Direct Injected Gasoline Engine", Karl et al, Mercedes–Benz AG, Feb. 24–27, 1997.

Primary Examiner—Erick R. Solis
Attorney, Agent, or Firm—Jerome R. Drouillard

[57] ABSTRACT

A cooling system for a reciprocating multicylinder internal combustion engine includes discharge passages for conducting coolant from the cylinder block to specific regions of the cylinder head so as to increase the localized heat transfer coefficient between coolant and the cylinder head. Flow through the cylinder head is separated into an intake side flow and a central and exhaust side flow so as to promote better heat transfer and to allow the engine to be operated with a higher compression ratio and greater spark advance.

15 Claims, 4 Drawing Sheets

COOLING SYSTEM FOR INTERNAL COMBUSTION ENGINE

BACKGROUND OF THE INVENTION

1. Technical Field

The present invention relates to a cooling system for a reciprocating multicylinder internal combustion engine.

2. Disclosure Information

As fuel economy requirements of modern automotive reciprocating internal combustion engines grow increasingly more stringent, automotive engineers are searching for methods and structures which will allow the extraction of ever greater fuel efficiency. One approach to greater operating efficiency is to increase both the compression ratio and the spark advance. Unfortunately, knock quickly becomes a factor as either or both compression ratio and spark advance increase. The inventors of the present invention have determined, however, that knock limited spark advance, as well as compression ratio, may be increased if precision cooling of the cylinder head, and indeed the entire engine, is employed according to the present invention. SAE Technical Papers 912469 and 912467 illustrate systems in which coolant flow is provided through separate circuits located in the engine cylinder head. The inventors of the instant cooling system have, however, determined that merely separating flow through the cylinder head is insufficient to provide the precision cooling needed to increase the knock limited spark advance to any appreciable degree. Rather, what is needed is the more focused approach to cooling provided by the present invention.

In the case of direct injected spark ignited engines (DISI), the spark plug and fuel injector may be located in a central land extending over the cylinder. In this case, it is desirable to provide cooling of the central land so as to avoid problems with fuel coking on the injector nozzle as well as octane limitations.

SUMMARY OF THE INVENTION

A cooling system for a multicylinder internal combustion engine includes a radiator, a pump for receiving coolant from the radiator, and a cylinder head having a plurality of intake and exhaust ports formed therein. At least one intake port and one exhaust port services each cylinder, and the cylinder head further has a plurality of fuel injectors and spark plugs, with at least one fuel injector and one spark plug being housed in the cylinder head so as to service each cylinder. The spark plug and fuel injector may be housed in a central land extending over the cylinder(s).

According to the present invention, a first cylinder head coolant passage receives coolant from the coolant pump. The first cylinder head coolant passage extends along substantially the entire length of the cylinder head in proximity to the intake ports. A second cylinder head coolant passage extends along substantially the entire length of the cylinder head in proximity to the central lands, if used, which house the fuel injectors and spark plugs. Finally, a cylinder block coolant distribution system includes a coolant inlet for receiving coolant discharged by the first cylinder head coolant passage, and at least one primary discharge passage for providing a primary flow of coolant from the cylinder block to the second cylinder head coolant passage as well as a plurality of secondary discharge passages for conducting coolant from the cylinder block to specific regions of the second cylinder head cooling passage.

According to another aspect of the present invention, the secondary discharge passages may comprise passages which conduct coolant from the highest portion of the cylinder block to the central lands housing the fuel injectors and spark plugs. Certain of the secondary discharge passages may conduct coolant into impingement with baffles extending into the second cylinder head cooling passage in a direction toward the fire deck of the cylinder head, with the baffles defining a coolant passage immediately overlying the fire deck of the cylinder head and urging coolant to flow in contact with the fire deck. The secondary discharge passages and baffles will cause a two-dimensional flow in the bulk coolant flowing through the cylinder head cooling passage.

According to another aspect of the present invention, the primary flow of coolant through the primary discharge passage into the second cylinder head cooling passage preferably has a volume rate in excess of 50% of the flow through the first cylinder head cooling passage.

It is an advantage of the present invention that the combination of the present baffles and secondary discharge passages will cooperate to define a fluidic nozzle for establishing two-dimensional flow in the bulk coolant flowing through the second cylinder head cooling passages past the baffles and secondary discharge passages. In this manner, bulk flow will be caused to scrub the upper surface of the cylinder's fire deck so as to greatly increase the coefficient of heat transfer between the coolant and the cylinder head. This is particularly important in the bridge areas extending between the cylinders and will enhance the knock limited spark advance capability of an engine having a system according to the present invention.

Other advantages of the present invention will become apparent to the reader of this specification.

DETAILED DESCRIPTION OF PREFERRED EMBODIMENTS

Figure 1:
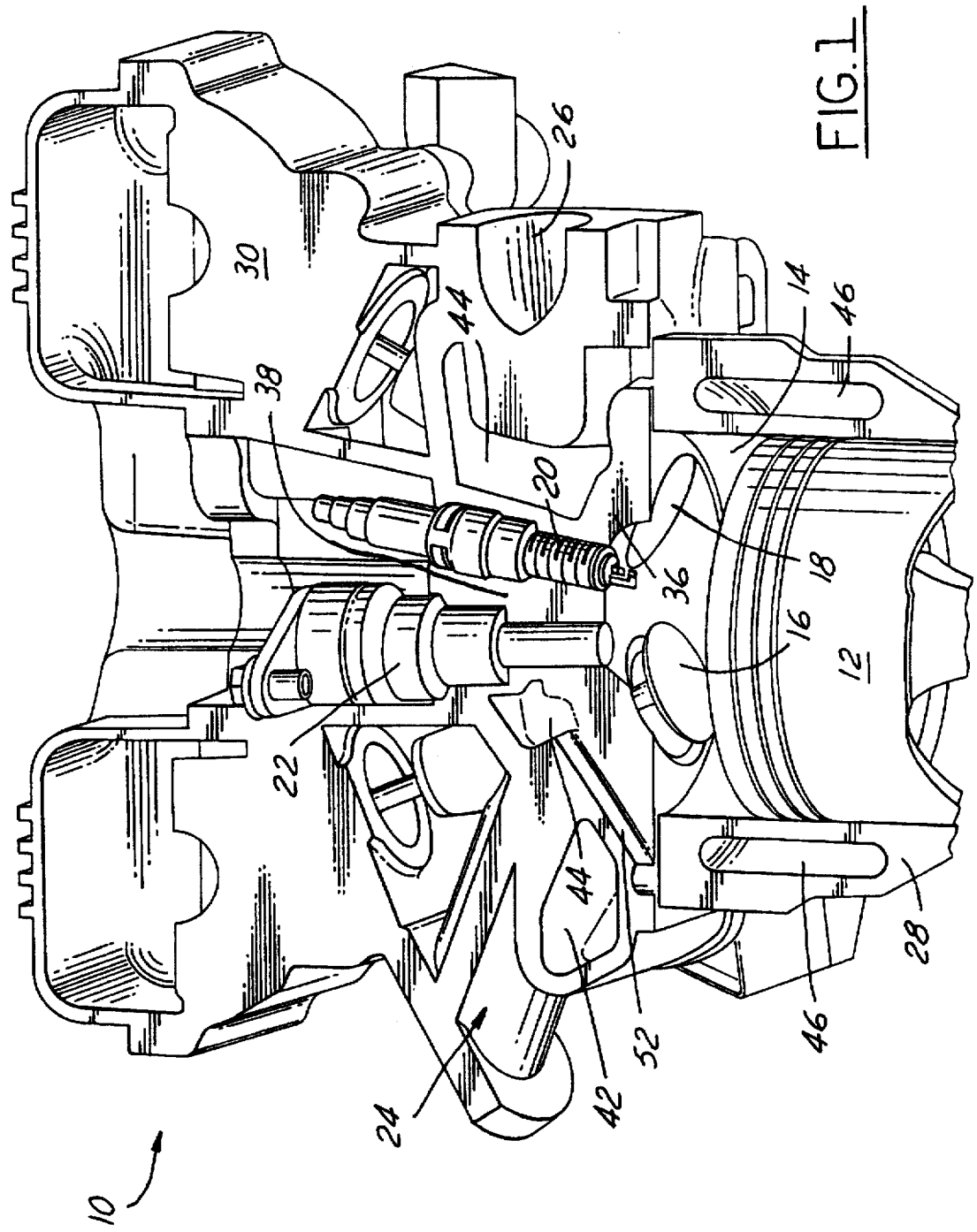
FIG. 1 is a sectional view, partially broken away, of an engine having a cooling system according to the present invention.

As shown in FIG. 1, engine 10 has a piston 12 reciprocatingly housed therein in a cylinder 14. Of course, although only one piston and cylinder are shown for the sake of convenience, a system according to the present invention could be employed with engines having any number of cylinders arranged either in-line or in a vee type of configuration, or in other configurations either known to those skilled in the art or suggested by this disclosure.

Air charge is allowed into cylinder 14 by intake valves 16 and exhaust is conducted from cylinder 14 by means of exhaust valve 18. Intake ports 24 and exhaust ports 26 service intake valve 16 and exhaust valve 18, respectively. Fuel is provided to cylinder 14 by means of fuel injector 22, and energy for initiating combustion is provided by spark plug 20. Injectors 22 and spark plugs 20 are mounted within central land 38 which is part of cylinder head 30.

Figure 5:
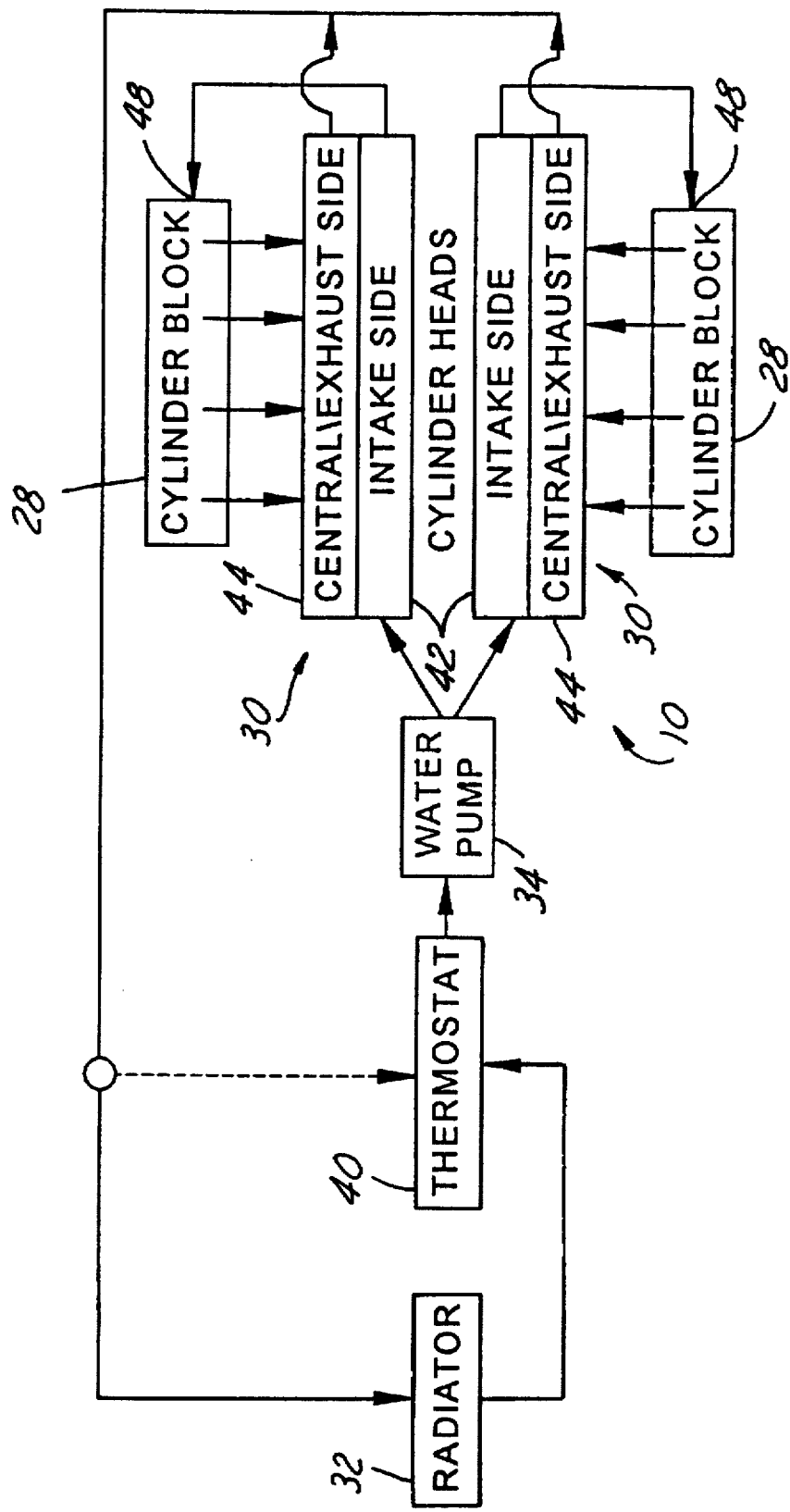
FIG. 5 is a schematic representation of a cooling system according to the present invention.

As noted above, a schematic representation of flow through an engine having a cooling system according to the present invention is set forth in FIG. 5. Coolant begins flowing at radiator 32 then passes through thermostat 40 and into water pump 34. Coolant passes through engine 10 first through the intake side of the cylinder heads by means of first cylinder head coolant passages 42. The reader of this specification will note that the schematic shown in FIG. 5 is for a V-type of engine having two cylinder heads, it being understood that a cooling system according to the present invention could be applied to an engine having but a single bank of cylinders.

Coolant passing through first cylinder head coolant passages 42 then passes through cylinder block coolant inlet 48 and into cylinder block 28. After passing into cylinder block 28, coolant comes into the central or exhaust side of cylinder head 30. Coolant is allowed to flow at this time through second cylinder head coolant passage 44 and then back to radiator 32.

As shown in FIG. 1, first cylinder head coolant passages 42, after receiving coolant from pump 34, allow the coolant to pass along substantially the entire length of cylinder head 30 in proximity to intake ports 24. This, importantly, allows cooling of the cylinder head so as to result in cooling of the intake air charge, which beneficially impacts the torque and power output of an engine having a system according to the present invention.

FIG. 1 further shows the placement of second cylinder head coolant passages 44 which allow coolant to reach in the area of injector and spark plug land 38 as well as fire deck 36 of cylinder head 30.

Figure 2:
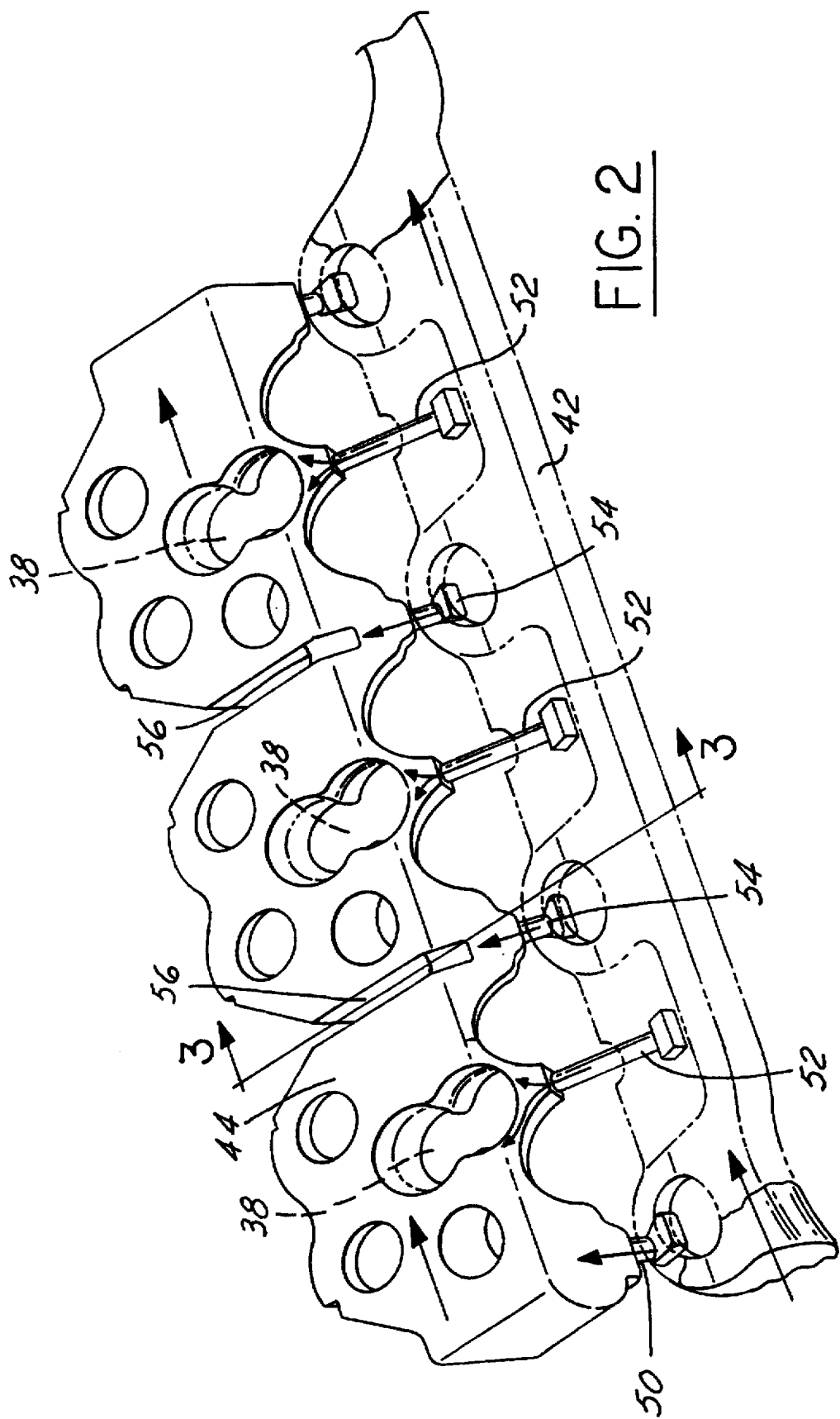
FIG. 2 illustrates water passages and flow paths of a cooling system according to the present invention.

FIG. 2 illustrates greater detail of first cylinder head coolant passage 42 and second cylinder head coolant passage 44. After flowing the length of first cylinder head coolant passage 42, the coolant passes into cylinder block 28, and flows the length of cylinder block 28 through cylinder block coolant passage 46. Thereafter, coolant flows up into cylinder head 30 by means of primary discharge passage 50 and into second cylinder head coolant passage 44. Flow through primary discharge passage 50 is preferably at least 50% of the bulk coolant flow through the engine. This will, in turn, establish a bulk flow through second cylinder head coolant passage 44. This bulk flow is then operated on, or manipulated, according to the present invention by means of flow through the secondary discharge passages.

A first set of secondary discharge passages 52 is shown in FIGS. 1 and 2. Secondary discharge passages 52 direct coolant upon injector and spark plug lands 38 so as to provide additional cooling to those components.

Figure 3:
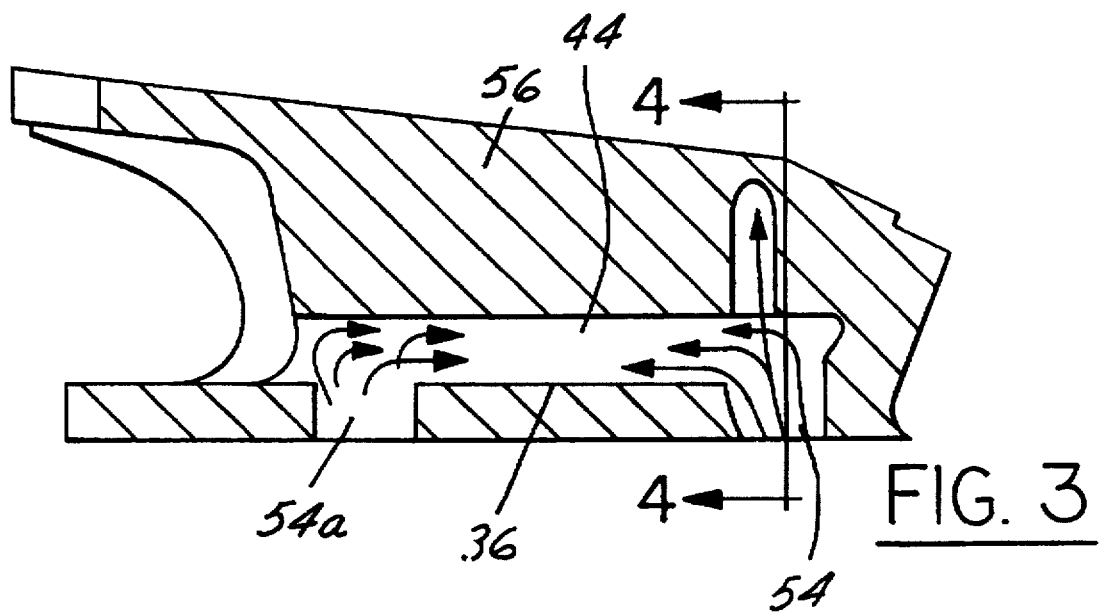
FIG. 3 illustrates a section of a cylinder head flow path according to the present invention, taken along the line 3—3 of FIG. 2.
Figure 4:
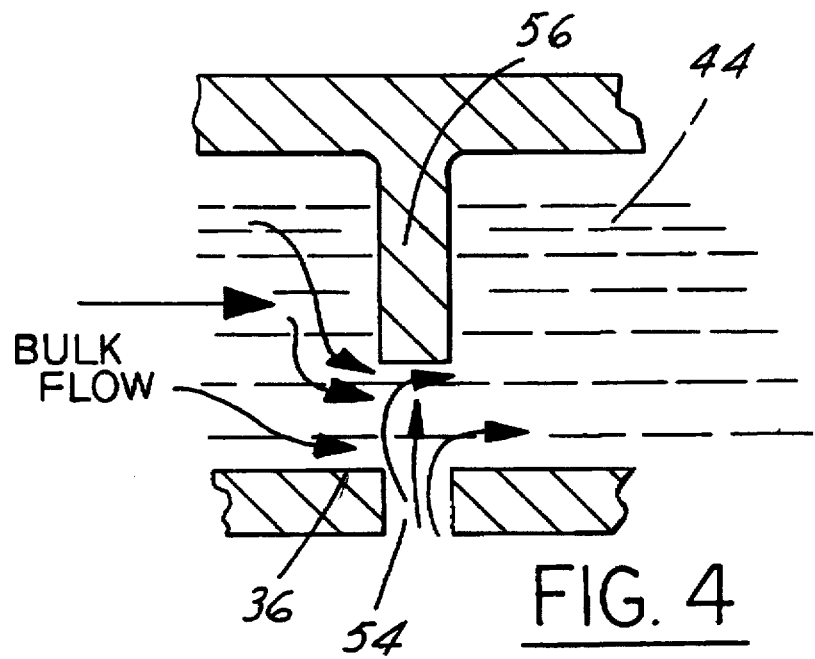
FIG. 4 is a partial section of a cooling system according to the present invention taken along the line 4—4 of FIG. 3.

A second type of secondary discharge passage 54 serves to conduct coolant to a baffle area defined by baffles 56 which extend into second cylinder head cooling passages 44 in a direction toward fire deck 36 of cylinder head 30. Baffles 56 define a coolant passage immediately overlying fire deck 36, and urge coolant to flow in contact with fire deck 36. This urging is assisted by secondary discharge passages 54 and 54a. These passages are shown in detail in FIG. 3 and in FIG. 4 (54 only). As shown in FIGS. 3 and 4, the bulk flow through second cylinder head coolant passages 44 is caused to undergo a two-dimensional flow transition by the discharge of fluid by secondary discharge passages 54 and 54a. In effect, baffles 56 and passages 54 and 54a serve as a fluidic nozzle for establishing two-dimensional flow in the bulk coolant flowing past the baffle in the secondary passages. This two-dimensional flow beneficially causes a scrubbing of fire deck 36, with the effect of increasing heat transfer coefficient between the coolant and cylinder head 30 in the scrubbed region. The two-dimensional nature of the flow caused by secondary discharge passages 54 and 54a arises from the fact that the bulk flow is in a direction parallel to the longitudinal axis, or simply put, the engine's crankshaft, whereas secondary passages 54 and 54a induce flow which is perpendicular to the engine's longitudinal axis. Thus, the two-dimensional flow has velocity components both parallel to and perpendicular to a longitudinal axis of the engine. Baffle 56 has steam and air escape opening 58 formed therein, so as to allow gases which would otherwise become trapped to flow through and out of cylinder head 30.

Another advantage of passages 52 is that any air or gas trapped in the upper region of cylinder block 28 will be exhausted through passages 52, thereby promoting the presence of only liquid coolant in passage 46.

While the invention has been shown and described in its preferred embodiments, it will be clear to those skilled in the arts to which it pertains that many changes and modifications may be made thereto without departing from the scope of the invention.

We claim:

1. A cooling system for a reciprocating multicylinder internal combustion engine, comprising:
   a radiator;
   a pump for receiving coolant from the radiator;
   a cylinder head having a plurality of intake and exhaust ports formed therein, with at least one intake port and one exhaust port servicing each cylinder, with said cylinder head further having a plurality of fuel injectors and spark plugs with at least one fuel injector and one spark plug being housed in a central land extending over each cylinder;
   a first cylinder head coolant passage for receiving coolant from the pump, with said first cylinder head coolant passage extending along substantially the entire length of the cylinder head in proximity to the intake ports;
   a second cylinder head coolant passage extending along substantially the entire length of the cylinder head in proximity to the central lands which house the fuel injectors and the spark plugs; and
   a cylinder block coolant distribution system comprising:
      a coolant inlet for receiving coolant discharged by the first cylinder head coolant passage;
      at least one primary discharge passage for providing a primary flow of coolant from the cylinder block to the second cylinder head cooling passage, and
      a plurality of secondary discharge passages for conducting coolant from the cylinder block to specific regions of the second cylinder head cooling passage.

2. A cooling system according to claim 1, wherein said secondary discharge passages comprise passages which conduct coolant from the highest portion of the cylinder block to the central lands housing the fuel injectors and spark plugs.

3. A cooling system according to claim 1, wherein said secondary discharge passages comprise passages which conduct coolant and any air or vaporized coolant from the highest portion of the cylinder block to the second cylinder head coolant passage.

4. A cooling system according to claim 1, wherein said secondary discharge passages comprise passages which conduct coolant from the cylinder block to the second cylinder head coolant passage at points located in bridge areas between adjacent cylinders.

5. A cooling system according to claim 4, wherein said secondary discharge passages conduct coolant into impingement with baffles extending into the second cylinder head cooling passage in a direction toward the fire deck of the cylinder head, with said baffles defining a coolant passage immediately overlying the fire deck of the cylinder head and urging coolant to flow into contact with the fire deck.

6. A cooling system according to claim 5, wherein said secondary discharge passages and said baffles cause two dimensional flow in the bulk coolant flowing through the second cylinder head cooling passage.

7. A cooling system according to claim 1, wherein primary flow of coolant through the primary discharge passage into the second cylinder head cooling passage has a volume rate in excess of 50 per cent of the flow through the first cylinder head cooling passage.

8. A cooling system for a reciprocating multicylinder internal combustion engine, comprising:

a radiator;

a pump for receiving coolant from the radiator;

a cylinder block having first and second ends;

a cylinder head having a plurality of intake and exhaust ports formed therein, with at least one intake port and one exhaust port servicing each cylinder, with said cylinder head further having a plurality of fuel injectors and spark plugs with at least one fuel injector and one spark plug being housed in a central land extending over each cylinder;

a first cylinder head coolant passage for receiving coolant from the pump, with said first cylinder head coolant passage extending along substantially the entire length of the cylinder head in proximity to the intake ports, with said first cylinder head coolant passage discharging coolant directly into the first end of the cylinder block;

a second cylinder head coolant passage extending along substantially the entire length of the cylinder head in proximity to the central lands which house the fuel injectors and the spark plugs; and a cylinder block coolant distribution system comprising:

a coolant inlet located in the first end of the block for receiving coolant discharged by the first cylinder head coolant passage, with said coolant inlet communicating with a whole block coolant passage extending the length of the cylinder block from the first end to the second end;

a primary discharge passage for providing a primary flow of coolant from a port located in the second end of the cylinder block to the second cylinder head cooling passage; and a plurality of secondary discharge passages for conducting coolant from the cylinder block to specific regions of the second cylinder head cooling passage.

9. A cooling system according to claim 8, wherein said secondary discharge passages comprise passages which conduct coolant from the highest portion of the cylinder block to the central lands housing the fuel injectors and spark plugs.

10. A cooling system according to claim 8, wherein said secondary discharge passages comprise passages which conduct coolant and any air or vaporized coolant from the highest portion of the cylinder block to the second cylinder head coolant passage.

11. A cooling system according to claim 8, wherein said secondary discharge passages comprise passages which conduct coolant from the cylinder block to the second cylinder head coolant passage at points located in bridge areas between adjacent cylinders.

12. A cooling system according to claim 11, wherein said secondary discharge passages conduct coolant into impingement with baffles extending into the second cylinder head cooling passage in a direction toward the fire deck of the cylinder head, with said baffles defining a coolant passage immediately overlying the fire deck of the cylinder head and urging coolant to flow into contact with the fire deck.

13. A cooling system according to claim 12, wherein said secondary discharge passages and said baffles cause two-dimensional flow in the bulk coolant flowing through the second cylinder head cooling passage past the baffles.

14. A cooling system according to claim 13, wherein said two-dimensional flow has velocity components both parallel to and perpendicular to a longitudinal axis of the engine.

15. A cooling system for a reciprocating multicylinder internal combustion engine, comprising:

a radiator;

a pump for receiving coolant from the radiator;

a cylinder block having first and second ends;

a cylinder head having a plurality of intake and exhaust ports formed therein, with at least one intake port and one exhaust port servicing each cylinder, with said cylinder head further having a plurality of fuel injectors and spark plugs with at least one fuel injector and one spark plug servicing each cylinder;

a first cylinder head coolant passage for receiving coolant from the pump, with said first cylinder head coolant passage extending along substantially the entire length of the cylinder head in proximity to the intake ports, with said first cylinder head coolant passage discharging coolant directly into the first end of the cylinder block;

a second cylinder head coolant passage extending along substantially the entire length of the cylinder head in proximity to the central lands which house the fuel injectors and the spark plugs; and a cylinder block coolant distribution system comprising:

a coolant inlet located in the first end of the block for receiving coolant discharged by the first cylinder head coolant passage, with said coolant inlet communicating with a block coolant passage extending the length of the cylinder block from the first end to the second end;

a primary discharge passage for providing a primary flow of coolant from a port located in the second end of the cylinder block to the second cylinder head cooling passage; and a plurality of secondary discharge passages for conducting coolant from the cylinder block to specific regions of the second cylinder head cooling passage., with said secondary discharge passages conduct coolant into impingement with baffles extending into the second cylinder head cooling passage in a direction toward the fire deck of the cylinder head, with said baffles and said secondary discharge passages cooperating to define a fluidic nozzle for establishing two dimensional flow in the bulk coolant flowing through the second cylinder head cooling passage past the baffles and the secondary discharge passages.

\* \* \* \* \*